UNITED STATES PATENT OFFICE.

JOHANNES M. KESSLER, OF WEST ORANGE, NEW JERSEY, ASSIGNOR TO E. I. DU PONT DE NEMOURS & COMPANY, OF WILMINGTON, DELAWARE, A CORPORATION OF DELAWARE.

COUMARONE COATING COMPOSITION.

1,411,035.

Specification of Letters Patent. Patented Mar. 28, 1922.

No Drawing. Application filed April 14, 1919. Serial No. 289,970.

*To all whom it may concern:*

Be it known that I, JOHANNES M. KESSLER, a citizen of Germany, and a resident of West Orange, in the county of Essex and State of New Jersey, have invented a certain new and useful Coumarone Coating Composition, of which the following is a specification.

This invention relates to coating compositions, and particularly to high grade lacquers, which contain as their essential constituents coumarone resin, a softener such as China wood oil and a volatile solvent. The invention pertains especially to lacquers which comprise a solution in benzenoid hydrocarbons of a coumarone resin of high melting point in conjunction with from about 10 to 50% of its weight of China wood oil.

I employ the expression lacquers or gum lacquers to refer to solutions of gums or resins in volatile solvents especially adapted for application to metal, as distinguished from spirit varnishes which are solutions of gums or resins in volatile solvents intended for application to wood.

Up to the present time the most successful lacquers, from a commercial standpoint, have been pyroxylin lacquers. Gum lacquers are valued according to their ability to shed water, speed of drying at normal temperature of the film deposited by them, and freedom from chalkiness on rubbing. Up to this date no gum lacquer can be found in the open market that will fulfill all these requirements and whose price is sufficiently low to compete successfully with pyroxylin lacquers. The highest quality gum lacquers known contain mostly highly refined shellac as the base and a large percentage of fusel oil in the solvent mixture making the cost of such a combination prohibitive for most purposes, particularly at the present time.

The main advantages of the ordinary gum lacquers when compared with pyroxylin or pyroxylin gum lacquers are (1st) low cost, (2nd) ability to shed water, therefore allowing lacquering of metals not previously dried, and (3rd) ease of application. This last point is particularly appreciated in such work as lacquering of chandelier chains, links and small objects. Here pyroxylin lacquers can hardly be used as they would web on account of their high viscosity or if thinned down considerably the resulting film would be too thin to offer protection against tarnishing. Gum lacquers, being high in solids and at the same time of low viscosity work very well for dipping and brushing purposes and give a bright finish which adheres firmly to the metal and offers relatively good protection from tarnishing.

Although gum lacquers as above described offer certain advantages, their defects, such as slowness of drying and liability to chalk on rubbing, have been such as to seriously interfere with their general use.

The principal object of my invention is to provide a gum lacquer which dries quickly and possesses the other desired qualities of high grade lacquers, and which can be produced at a relatively low cost.

In the course of an extensive investigation to determine the comparative value of numerous resins, softeners and solvents as lacquer constituents, I discovered that a lacquer having practically all the desired qualities, including quick drying and low cost, could be obtained by using a high melting coumarone resin with China wood oil as a softener. As solvents I have found the benzenoid hydrocarbons to be suitable, either singly or mixed together.

A vegetable oil in order to act as a suitable softener should have the following properties:

Specific gravity, .936 to .944 at 15° C.
Saponification value, 189.8 to 196.6.
Iodine value, 158 to 173.3.
Refraction index, 1.5110 to 1.5239 at 20° C.

The properties of both crude and refined China wood oil fall within these limits.

The function of the China wood oil in the new composition is to soften and toughen the resin film which forms the coating of the lacquered metal. Without a softener of some kind the resin film is brittle and easily disintegrated, with a consequent appearance of chalkiness. Most of the waxes, oils, and other organic compounds which were tried out as softeners, while improving the film with regard to chalking, at the same time hindered the proper drying of the films. China wood oil, however, actually accelerated the drying of the lacquer films, and at the same time greatly improved the films with respect to chalking. The favorable effect of the China wood oil is most noticeable when it is used in proportions of from about 10% to 50% of the total resin present. In practice I prefer to use from 20 to 25% of the oil based on the total resin content. Crude, boiled, and refined China wood oil will give uniformly good results.

The benzenoid hydrocarbons which are suitable as solvents and easily obtainable are chiefly benzene, toluene, xylene, and solvent naphtha, the latter being a complex mixture of benzenoid hydrocarbons. It is usually preferable to employ the hydrocarbons in the form of their mixtures, since such mixtures as, for instance, 60% by volume of xylene and 40% by volume of benzene (known as toluene substitute), may be obtained at a lower cost than that demanded for pure benzene, toluene, etc. Hydrocarbons may be used alone if desired.

The speed of drying of a gum lacquer film depends to a great extent on the melting point of the resin which has been used as the base for the lacquer. The commercial coumarone resins obtainable on the market at the present time have a melting point ranging from about 65 to 80° C. Although such a resin, when used with China wood oil and suitable solvents in the proportions specified, gives a fairly good lacquer, I have found that the drying quality, and consequently the value, of the lacquer is greatly increased by using a coumarone resin having a melting point of at least 85° C.

The successful production of the above-mentioned special coumarone resin having the desired properties of high melting point, light color, etc., depends to a great extent upon the careful removal of certain unsaturated compounds from the crude naphtha which is ordinarily used as the source of coumarone resin, before subjecting said naphtha to a polymerizing treatment. The details of a suitable process for producing the desired high melting point resin are as follows:

Crude naphtha, obtained as a residue from so-called "holder oil" when the latter is distilled with live steam to drive off benzene and toluene, is first given a preliminary wash with 0.1 to 0.3% by weight of sulfuric acid (95% strength), neutralized with 10% sodium hydroxide solution and then distilled. The water-white naphtha obtained as a distillate is heated to 110–120° F. and 0.75 to 1.0% of anhydrous aluminum chloride is added in such proportions that positive temperature control may be maintained throughout the polymerization, the temperature not being allowed to exceed about 175° F. After a polymerizing period of from 4 to 6 minutes the polymerized naphtha is washed twice with hot water, then twice with a 10% sodium hydroxide solution and finally given two more water washes. The washed product is then distilled to separate the non-polymerized hydrocarbons, the distillation being continued until the temperature reaches 275° C. When this stage is reached the mass is poured from the still and allowed to cool. The coumarone resin obtained in this way is perfectly transparent, has a melting point of from 85° to 100° C. or higher, and has both a low iodine value (about 8) and a low saponification value (about 3.5) indicating a high alkali resistancy.

A high grade resin having a melting point above 85° C. may be obtained even if the preliminary treatment with sulfuric acid is omitted, provided the other directions for carrying out the process are carefully followed. In this case, however, and also when other naphthas than holder oil naphtha are used as the starting material, the iodine values and saponification values of the resulting resins are higher, the former ranging from 7.5 to 25, and the latter from 3.5 to 6. When the preliminary sulfuric acid treatment is employed, the variation in the composition of the better grade naphthas will usually result in variation in iodine value from 7.5 to 13.5.

In preparing a lacquer from the above described resins and China wood oil, I have found that these substances may be dissolved in the benzenoid hydrocarbons to produce the finished lacquer without it being necessary to heat the mixture. It has heretofore been proposed to make a varnish base by dissolving ordinary coumarone resin in China wood oil which has been heated to a temperature of 220°–240° C., and another heating was found necessary after this coumarone resin-China wood oil mixture was dissolved in suitable solvents.

My new lacquers may have for example the following compositions:

|  | (1) | (2) |
|---|---|---|
| Coumarone resin (m. p. 85–100° C.) | 20% | 15% |
| China wood oil, refined | 4% | 4% |
| Toluene substitute (40% benzene—60% xylene) | 76% | 81% |

When the lacquer is to be used for wet work, that is where the metal to be lacquered is still wet from a cleaning operation when the lacquer is applied, I have found it to be desirable to replace part of the benzenoid hydrocarbons with water-insoluble alcohols of suitable boiling range, as, for example, butyl alcohol or fusel oil, the latter consisting mainly of amyl alcohol. In general such alcohols are suitable as are not miscible with water, and which volatilize at such a rate as not to substantially retard drying of the lacquer coating. Such alcohols as butyl alcohol and those contained in fusel oil may be referred to generically as monohydric alcohols containing from four to six carbon atoms.

Typical lacquers for wet work may have the following compositions:

|  | (3) | (4) |
|---|---|---|
| Coumarone resin | 20% | 15% |
| China wood oil | 4% | 4% |
| Benzenoid hydrocarbons | 66% | 71% |
| Refined fusel oil | 10% | 10% |

Because of the favorable action of China wood oil in accelerating the drying of the lacquer film it was found possible to use another vegetable oil in conjunction with the China wood oil without retarding the drying of the film beyond the prescribed limits. In preparing a lacquer from vegetable drying oils such as linseed oil, in addition to China wood oil, I use them in such proportions that the total oil content will be from 10 to 50%, and preferably 20%, of the total resin content of the lacquer.

Suitable lacquers containing both China wood oil and another vegetable oil may be illustrated by the following formulæ:

|  | (5) | (6) |
|---|---|---|
| Coumarone resin | 20% | 20% |
| China wood oil | 2% | 2% |
| Soya bean oil | 2% | -- |
| Raw or boiled linseed oil | -- | 2% |
| Benzene | -- | 20% |
| Toluene | -- | 20% |
| Xylene | 66% | 36% |
| Butyl alcohol | 10% | -- |

Another example of a suitable lacquer is one containing about 20 parts of coumarone resin, about 4 parts of a softener comprising China wood oil and linseed oil and 76 parts of a mixture of benzenoid hydrocarbons and amyl alcohol.

In preparing the new lacquers the ingredients may be mixed in any desired order. It is preferable to add the solvents to the dissolving vessel before adding the gum to prevent the latter from sticking to the sides of the vessel. After solution has been accomplished the liquid is filtered to remove sand, or other insoluble substances that may be present; the solution is then ready for use.

It is to be understood that my invention is not limited to the combination of a hydrocarbon oil or other volatile solvent with a mixture of coumarone resin and China wood oil, but includes the mixture of coumarone resin and China wood oil having the characteristics and proportions set forth above and defined in the appended claims. A coating composition composed of coumarone resin and China wood oil in the proportions hereinbefore described, and from which the solvent has evaporated, comes within the scope of my invention.

I claim:

1. A lacquer comprising a coumarone resin having a melting point above 85° C., an iodine value of from about 7.5 to 13.5, a saponification value of from 3.5 to 6, a softener for said resin and a volatile solvent.

2. A lacquer comprising 100 parts of coumarone resin having a melting point above 85° C. and less than 50 parts of China wood oil, both in solution in a benzenoid hydrocarbon.

3. A lacquer comprising 100 parts of coumarone resin having a melting point above 85° C. and less than 50 parts of China wood oil, both in solution in a mixture of benzene and xylene.

4. A lacquer comprising 100 parts of coumarone resin having a melting point above 85° C. and less than 50 parts of China wood oil, both in solution in a mixture of a benzenoid hydrocarbon and a volatile alcohol immiscible with water.

5. A lacquer comprising 100 parts of coumarone resin having a melting point above 85° C. and less than 50 parts of China wood oil, both in solution in a mixture of a benzenoid hydrocarbon and refined fusel oil.

6. A lacquer comprising coumarone resin and China wood oil in solution in a mixture of a volatile, water-insoluble alcohol and another volatile organic solvent.

7. A lacquer comprising coumarone resin and China wood oil in solution in a mixture of a volatile hydrocarbon and a monohydric alcohol having from four to six carbon atoms.

8. A lacquer comprising coumarone resin and China wood oil in solution in a mixture of a benzenoid hydrocarbon and an amyl alcohol.

9. A lacquer comprising a coumarone resin having a melting point above 85° C., an iodine value of from about 7.5 to 13.5, a saponification value of from 3.5 to 6, a volatile solvent and sufficient China wood oil to soften and toughen the resin after the solvent has evaporated.

10. A coating composition comprising 100 parts of coumarone resin having a melting point above 85° C. and from about 20 to 25 parts of China wood oil.

11. A coating composition comprising 100 parts of coumarone resin and from about 20 to 25 parts of China wood oil.

12. A coating composition comprising China wood oil and a coumarone resin having a melting point above 85° C., an iodine value of from 7.5 to 25, and a saponification value of from 3.5 to 6.

13. A coating composition comprising from about 10 to 50 parts of China wood oil and 100 parts of a coumarone resin having a melting point above 85° C., an iodine value of from 7.5 to 25, and a saponification value of from 3.5 to 6.

14. A lacquer comprising coumarone resin, China wood oil and another vegetable drying oil in solution in a volatile organic solvent, the total oil content amounting to from about 10 to 50% by weight of the resin.

15. A lacquer comprising coumarone resin, China wood oil and another vegetable drying oil in solution in a benzenoid hydrocarbon, the total oil content amounting to from about 10 to 50% by weight of the resin.

16. A lacquer comprising coumarone resin, China wood oil and another vegetable drying oil in solution in a mixture of benzene and xylene, the total oil content amounting to from about 10 to 50% by weight of the resin.

17. A lacquer comprising coumarone resin, China wood oil and another vegetable drying oil in solution in a mixture of benzene, xylene and amyl alcohol, the total oil content amounting to from about 10 to 50% by weight of the resin.

18. A lacquer comprising coumarone resin having a melting point above 85° C., China wood oil and another vegetable drying oil in solution in a volatile organic solvent, the total oil content amounting to from about 10 to 50% by weight of the resin.

19. A lacquer comprising about 20 parts of coumarone resin, about 4 parts of a softener comprising China wood oil, and 76 parts of a volatile organic solvent.

20. A lacquer comprising about 20 parts of coumarone resin, about 4 parts of a softener comprising China wood oil and linseed oil, and 76 parts of a volatile organic solvent.

21. A lacquer comprising about 20 parts of coumarone resin, about 4 parts of a softener comprising China wood oil, and 76 parts of a volatile organic solvent comprising a benzenoid hydrocarbon.

22. A lacquer comprising about 20 parts of coumarone resin, about 4 parts of a softener comprising China wood oil and linseed oil, and 76 parts of a volatile organic solvent comprising a benezenoid hydrocarbon.

23. A lacquer comprising about 20 parts of coumarone resin, about 4 parts of a softener comprising China wood oil, about 66 parts of a mixture of benzenoid hydrocarbons and 10 parts of a volatile, water-insoluble alcohol.

24. A lacquer comprising about 20 parts of coumarone resin, about 4 parts of a softener comprising China wood oil and linseed oil, and 76 parts of a mixture of benzenoid hydrocarbons and an amyl alcohol.

25. A coating composition comprising China wood oil, another vegetable drying oil and coumarone resin.

26. A coating composition comprising China wood oil, another vegetable drying oil and a coumarone resin having a melting point above 85° C.

27. A coating composition comprising from about 10 to 50 parts of a softener comprising China wood oil and another vegetable drying oil, and 100 parts of coumarone resin.

28. A coating composition comprising from about 10 to 50 parts of a softener comprising China wood oil and another vegetable drying oil, and 100 parts of a coumarone resin having a melting point above 85° C.

29. A coating composition comprising from about 10 to 50 parts of a softener comprising China wood oil and linseed oil, and 100 parts of coumarone resin.

30. A coating composition comprising from about 10 to 50 parts of a softener comprising China wood oil and linseed oil, and 100 parts of a coumarone resin having a melting point above 85° C.

31. A coating composition comprising about 20 parts of a softener comprising China wood oil and another vegetable drying oil, and 100 parts of coumarone resin.

32. A coating composition comprising about 20 parts of a softener comprising about equal parts of China wood oil and another vegetable oil, and 100 parts of a coumarone resin having a melting point above 85° C.

33. A coating composition comprising 100 parts of a coumarone resin having a melting point above 85° C. and from about 20 to 25 parts of a softener therefor.

34. A coating composition comprising a coumarone resin having a melting point above 85° C., an iodine value of from 7.5 to 25, and a saponification value of from 3.5 to 6, and a softener for said resin.

35. A coating composition comprising a coumarone resin having a melting point above 85° C., an iodine value of from about 7.5 to 13.5, and a saponification value of from 3.5 to 6, and a softener for said resin.

36. A coating composition comprising China wood oil and a coumarone resin having a melting point above 85° C., an iodine value of about 8, and a saponification value of about 3.5.

In testimony whereof I affix my signature.

JOHANNES M. KESSLER.